No. 822,008. PATENTED MAY 29, 1906.
A. H. MEACH.
PENHOLDER.
APPLICATION FILED JAN. 24, 1906.
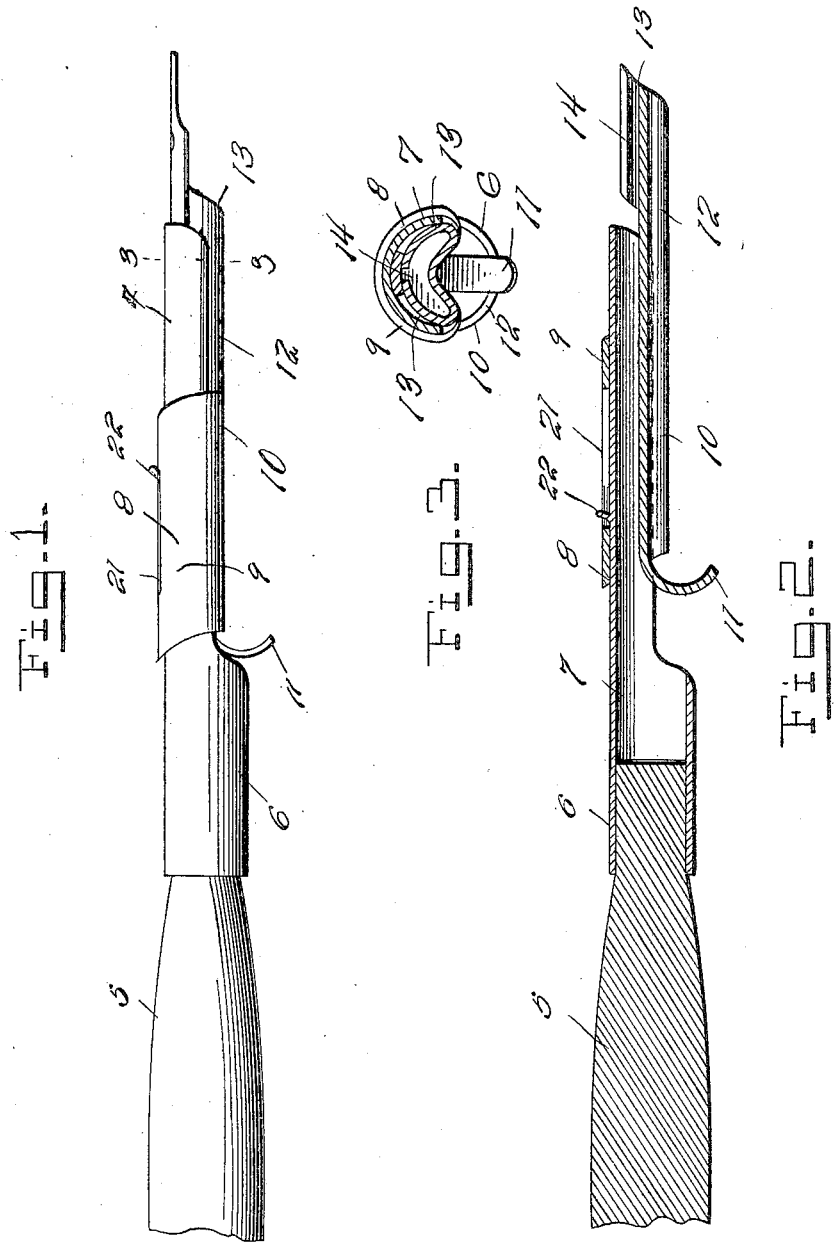
WITNESSES:
G. R. Thomas
E. W. Sheppard.
INVENTOR
A. H. Meach
By
Attorneys

UNITED STATES PATENT OFFICE.

ALONZO H. MEACH, OF BLISSFIELD, MICHIGAN.

PENHOLDER.

No. 822,008.  Specification of Letters Patent.  Patented May 29, 1906.

Application filed January 24, 1906. Serial No. 297,632.

*To all whom it may concern:*

Be it known that I, ALONZO H. MEACH, a citizen of the United States, residing at Blissfield, in the county of Lenawee, State of Michigan, have invented certain new and useful Improvements in Penholders; and I do hereby declare the following to be a full, clear, and exact description of the invention, such as will enable others skilled in the art to which it appertains to make and use the same.

This invention relates to penholders, and more particularly to ejecting-penholders, and has for its object to provide a penholder which will be extremely simple and cheap and which may be easily operated to discharge a pen-point therefrom.

Other objects and advantages will be apparent from the following description.

In the drawings forming a portion of this specification, and in which like numerals of reference indicate similar parts in the several views, Figure 1 is a side elevation of the present penholder with the sliding member retracted. Fig. 2 is a longitudinal section of the penholder with the sliding member projected. Fig. 3 is a transverse section on line 3 3 of Fig. 2, taken through the wings and pen-point.

Referring now to the drawings, there is shown a penholder comprising a handle 5, having a cylindrical metallic sleeve 6, engaged at its forward end. The sleeve extends forwardly beyond the handle, and at its lower portion this forwardly-extending part is cut away to form a transversely-arcuate upper portion 7, which is approximately semicircular, as shown. Slidably engaged with the forward portion 7 of the sleeve there is a member 8, which includes a curved upper wall 9, resting upon the portion 7, and a bottom wall 10, which has a slight upward transverse curvature to lie with its central portion between the lower edges of the portion 7. This bottom wall 10 is turned downwardly at its rearward end to form a depending finger-piece 11, by which the member 8 may be slid upon the portion 7 of the sleeve, and at its forward end the bottom 10 has a forwardly-projection extension 12, provided at its forward portion with transversely-arcuate wings 13 at its opposite sides, which extend upwardly with their concave surfaces toward each other and with their free longitudinal edges in spaced relation, these wings thus forming a core 14 at the forward end of the extension 12.

When the member 8 is at the rearward limit of its movement, the core 14 rests against the concave surface of the portion 7 at the forward portion thereof and is thus arranged to frictionally engage and hold a pen-point disposed between it and the portion 7, the extension 12 having slight resilience to hold the core 14 yieldably against movement away from the portion 7. It will be seen that when the member 8 is slid forwardly a pen-point as just described will be released.

The member 8 is provided with a longitudinal slot 21 in its upper portion, and a spring member 22 is carried by the forward portion 7 of the sleeve 6 and extends upwardly through the slot to limit the movement of the sliding member.

What is claimed is—

1. A penholder comprising a handle, a sleeve engaged with the handle and extending forwardly therebeyond, said forwardly-extending portion being cut away at its lower portion to form a transversely-arcuate portion open at its bottom, a member including a curved upper wall and a bottom wall, the forward portion of the sleeve being engaged within said member for sliding movement of the member thereupon, said bottom wall having a transverse upper curvature to bring its central portion between the lower edges of the forward portion of the sleeve, a depending finger-piece carried by the rearward end of the bottom wall, and a core connected with the member and arranged to lie against the inner surface of the forward portion of the sleeve when the member is at the rearward limit of its movement, and to lie forwardly of the sleeve when the member is at the forward limit of its movement, and means for limiting the movement of the member in both directions.

2. A penholder comprising a handle, a sleeve engaged with the handle and having a cut-away portion at its lower side, a hollow member in which the sleeve is slidably engaged, said hollow member having a lower wall curved to extend into the cut-away portion of the sleeve, said hollow member having wings at its forward end and being movable upon the sleeve to bring its wings into and out of the sleeve, means for limiting the movement of the member in both directions, and a downwardly-extending finger-piece carried by the member.

In testimony whereof I affix my signature in presence of two witnesses.

ALONZO H. MEACH.

Witnesses:
 AVERY S. BEARDSLEY,
 A. H. BEARDSLEY.